United States Patent
Chen et al.

(10) Patent No.: US 9,093,898 B2
(45) Date of Patent: Jul. 28, 2015

(54) BUCK CONVERTER WITH SINGLE STAGE

(71) Applicant: INDUSTRIAL TECHNOLOGY RESEARCH INSTITUTE, Hsin-Chu (TW)

(72) Inventors: Po-Yen Chen, Taipei (TW); Ching-Tsai Pan, Hsinchu (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 272 days.

(21) Appl. No.: 13/777,996

(22) Filed: Feb. 26, 2013

(65) Prior Publication Data

US 2014/0103899 A1  Apr. 17, 2014

(30) Foreign Application Priority Data

Oct. 12, 2012 (TW) .............................. 101137736 A

(51) Int. Cl.
*H02M 3/158* (2006.01)
*H02M 1/14* (2006.01)
*H02M 3/155* (2006.01)

(52) U.S. Cl.
CPC .............. *H02M 1/14* (2013.01); *H02M 3/155* (2013.01); *H02M 3/158* (2013.01)

(58) Field of Classification Search
CPC .......... H02M 1/14; H02M 2001/0083; H02M 3/156; H02M 3/158; H02M 3/155
See application file for complete search history.

(56) References Cited

U.S. PATENT DOCUMENTS

| 7,940,540 B2 | 5/2011 | Vinciarelli |
| 2010/0066332 A1 | 3/2010 | Gray et al. |
| 2010/0259241 A1* | 10/2010 | Cuk .............................. 323/311 |

FOREIGN PATENT DOCUMENTS

| TW | 299089 | 2/1997 |
| TW | 238589 B | 8/2005 |
| TW | 305076 B | 1/2009 |
| TW | 201038133 A | 10/2010 |
| TW | 201218603 A | 5/2012 |

OTHER PUBLICATIONS

Yu, Wensong., High-Efficiency DC-DC Converter With Twin Bus for Dimmable LED Lighting, 2010 IEEE Energy Conversion Congress and Exposition (ECCE), 2010, pp. 457-462, Sep. 2010.

(Continued)

*Primary Examiner* — Harry Behm
(74) *Attorney, Agent, or Firm* — Locke Lord LLP; Tim Tingkang Xia, Esq.

(57) ABSTRACT

The present invention provides a buck converter with single stage. The buck converter includes a buck device, a semiconductor component coupled to the buck device, a first resonance circuit coupled to the semiconductor component for adjusting operation time constant, and a second resonance circuit coupled to the first resonance circuit for suppressing ripple. The present invention controls the actuation time of circuit architecture change through LC resonance circuit timing means, automatically changes circuit architecture without active element, is balanced automatically without control energy, and simplifies circuit design. The present invention is characteristic of negative voltage source, which overcomes problems of load voltage potential barrier, and realizes a circuit design of sharing the energy storage and the filtering elements, so as to achieve fast input response, low output ripple and long service life.

3 Claims, 4 Drawing Sheets

(56) References Cited

OTHER PUBLICATIONS

Babaei et al., Investigating Buck DC-DC Converter Operation in Different Operational Modes and Obtaining the Minimum Output Voltage Ripple Considering Filter Size, Journal of Power Electronics, 2011, vol. 11(6), pp. 793-800, Nov. 2011.

Garcia et al., Interleaved Buck Converter for Fast PWM Dimming of High-Brightness LEDs, IEEE Transactions on Power Electronics, vol. 26(9), pp. 2627-2636, Sep. 2011.

Intellectual Property Office, Ministry of Economic Affairs, R.O.C., "Office Action", May 8, 2014, Taiwan, 6 pages.

* cited by examiner

BUCK CONVERTER WITH SINGLE STAGE

CROSS REFERENCE TO RELATED APPLICATION

The present application is based on, and claims priority from, Taiwan (International) Application Serial Number 101137736, filed on Oct. 12, 2012, the disclosure of which is hereby incorporated by reference herein in its entirety.

TECHNICAL FIELD

The present disclosure is a buck converter with single-stage, and more particularly, to a buck converter with single-stage, which has an input rapid response, low-ripple output current and longer circuit useful life.

TECHNICAL BACKGROUND

Because inductance value of inductor being an energy storage component in the buck converter will affect input current response speed and output current ripple, the input current response speed is faster and the output current ripple is relatively larger if the inductance value of inductor being an energy storage component is smaller; otherwise, the buck converter input current response speed is slower and the output current ripple is smaller if the inductance value of inductor being an energy storage component is larger. Therefore, the traditional buck converter often uses the inductor with smaller inductance value and the output capacitor with larger capacitance value in order to achieve a faster input current response speed and a lower output current ripple. However, the capacitor with large capacitance value is required to use electrolytic capacitor, which is susceptible to the switch and the temperature such external environment factors causing its short service life and thus shorten the service life of capacitor.

In traditional non-isolated buck converter, the ideal buck converter as shown in FIG. 1 is the most basic traditional buck converter which mainly composed of the control IC, switching components, diodes, energy storage inductor and capacitor. The operation theory is described as below: when the power transistor is conducted, the voltage source charges the energy storage inductor, the capacitor C and provides energy to the output load; when the power transistor is cut off, the energy storage inductor uses its stored energy via the diode D to charge the capacitor C, also provides energy to the output load.

FIG. 2 shows the current widely used traditional flyback converter, which mainly used in less then 100 W isolation type buck converter. Since the circuit is simple and low cost, the flyback transformer in the circuit can also be used as energy storage, and the secondary end only need a diode and a capacitor. From a cost point of view, the flyback converter circuit is very competitive in the market. The flyback converter circuit is mainly composed of a control IC, a power transistor, a flyback transformer, a diode D and a capacitor. The control IC is used to control the power transistor conduction or cutoff, via the flyback transformer magnetizing inductance to proceed the energy storing and releasing, and cooperating with a secondary side the diode and the capacitor to proceed the rectifying and filtering of the output voltage, and then to get the output of the DC voltage. Its basic operation principle as follows: Due to the flyback transformer T, the circuit has electrical isolation, transformer and energy storage inductance of the triple function. Rigorous theoretical terms, the flyback transformer is not a real transformer, but a coupling inductor. By controlling the power transistor conduction or cutoff, the energy storage in the flyback transformer is passed to the secondary side, via the diode charging to the capacitor C and maintains the DC voltage at the set value. When the power transistor is conduction, the voltage source Vin is charging to the flyback transformer, and causes the diode D reverse-bias, meanwhile the capacitor C provides energy to the output capacitor. When the power transistor is cutoff, the energy of the flyback transformer via the diode charging to capacitor C and provides energy to the output terminal.

TECHNICAL SUMMARY

In one embodiment, the present disclosure provides a single-stage buck converter circuit, which includes: a buck device, a semiconductor component which is coupled to the buck device, a first resonant circuit which is coupled to the semiconductor component to adjust actuation time constant, and a second resonant circuit which is coupled to the first resonant circuit to suppress ripple.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
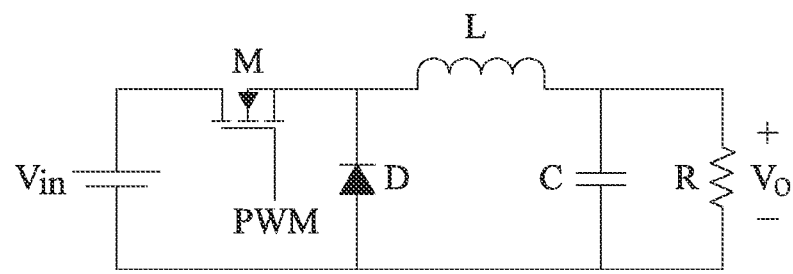
FIG. 1 shows basic traditional buck converter.
Figure 2:
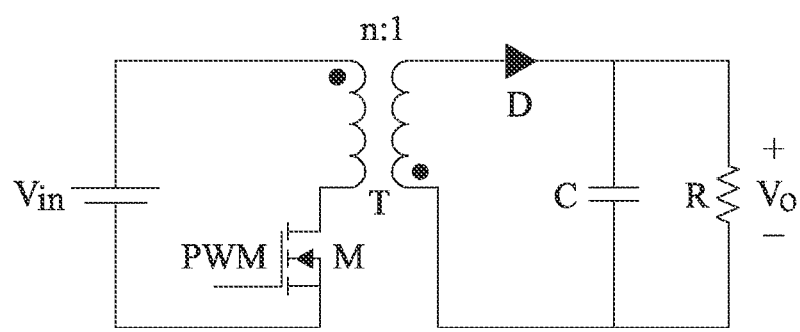
FIG. 2 is conventional flyback converter.
Figure 3:
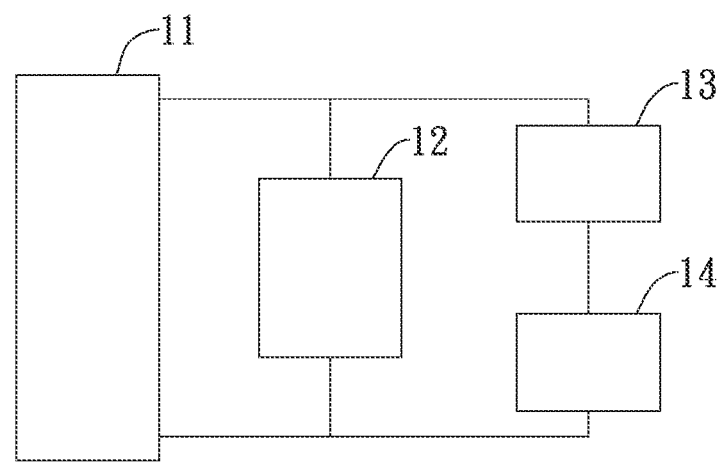
FIG. 3 is an embodiment of the single-stage buck converter according to the present disclosure.

FIG. 3 is an embodiment of the single-stage buck converter according to the present disclosure. The single-stage buck converter includes: a buck device 11, a semiconductor component 12, a first resonant circuit 13 and a second resonant circuit 14. The semiconductor component 12 can be a diode, which is used to adjust the output power and output voltage. The first resonant circuit 13 is coupled to the semiconductor element 12, used to adjust the actuation time constant. The second resonant circuit 14 is coupled to the first resonant circuit 13, used to suppress the ripple. And the buck device 11 can also be a buck converter.

Figure 4:
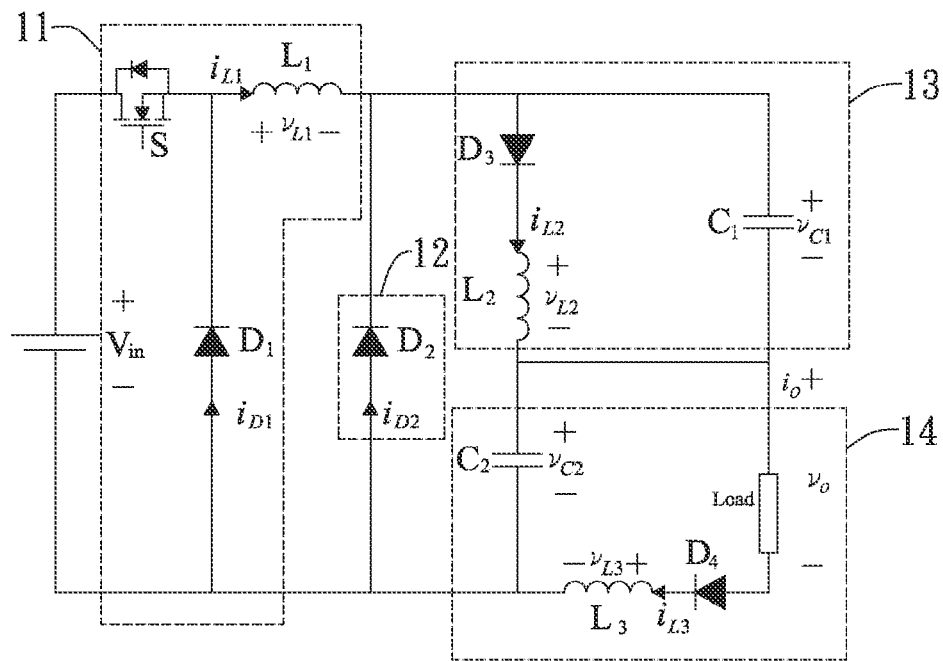
FIG. 4 shows the present disclosure application example.
Figure 5:
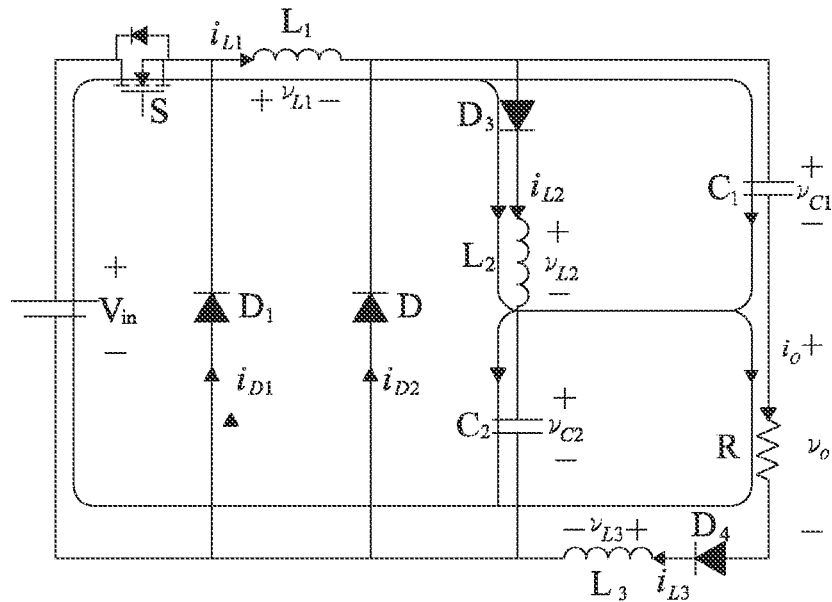
FIG. 5 shows the FIG. 4 circuit operation in the working model 1.

FIG. 4 shows the present disclosure application example. In this example, the buck device 11 includes a power transistor S, a first diode D1 which coupled to the power transistor S, and a first inductance L1 which coupled to the power transistor S and connected to the first diode D1 in parallel. The semiconductor component 12 is a diode D2. The first resonant circuit 13 includes a first capacitor C1 and a second inductance L2, the first capacitor C1 connects to the second inductance L2 in parallel. The first resonant circuit 13 also includes a second diode D3 which coupled to the first capacitor C1 and connected in series with the second inductance L2. The second resonant circuit 14 includes a second capacitor C2 and a third inductance L3, the second capacitor C2 is connected to the third inductance L3 in parallel. The second resonant circuit 14 also includes a third diode D4 which is coupled and series connection to the second capacitor C2. The second resonant circuit 14 also includes a load which is coupled to the second capacitor C2 and series connection to the third diode D4. In this example, assuming all the circuit components are ideal and the load is the resistance R, its working principle is as follows:

Working mode one: When the power transistor S is conduction, the circuit enters the working mode one. The input voltage Vin starts charging to the first inductance L1, the first capacitor C1, the second inductance L2, the third inductance L3 and the second capacitor C2, and also providing energy to the load, as shown in FIG. 5. When the second diode D3 is conduction, the buck converter circuit of the present disclosure is entering the working mode two.

Figure 6:
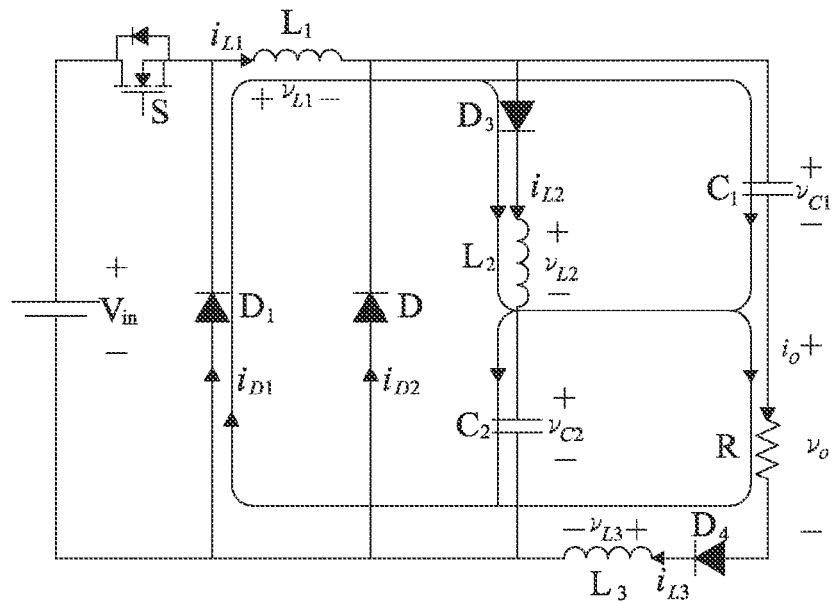
FIG. 6 shows the FIG. 4 circuit operation in the working model 2.

Working mode two: when the power transistor S is cutoff, the single-stage buck converter circuit enters the working mode two. The first inductance L1 via the first diode D1 proceeds charging and discharging to release energy, the first capacitor C1 and the second inductance L2 resonance impels the energy transferred quickly to the second capacitor C2 and the third inductance L3, thereby inhibiting while the increase in input energy caused the output current ripple. When the diode D2 is conduction, the single-stage buck converter circuit of the present disclosure is entering the working mode three, as shown in FIG. 6.

Figure 7:
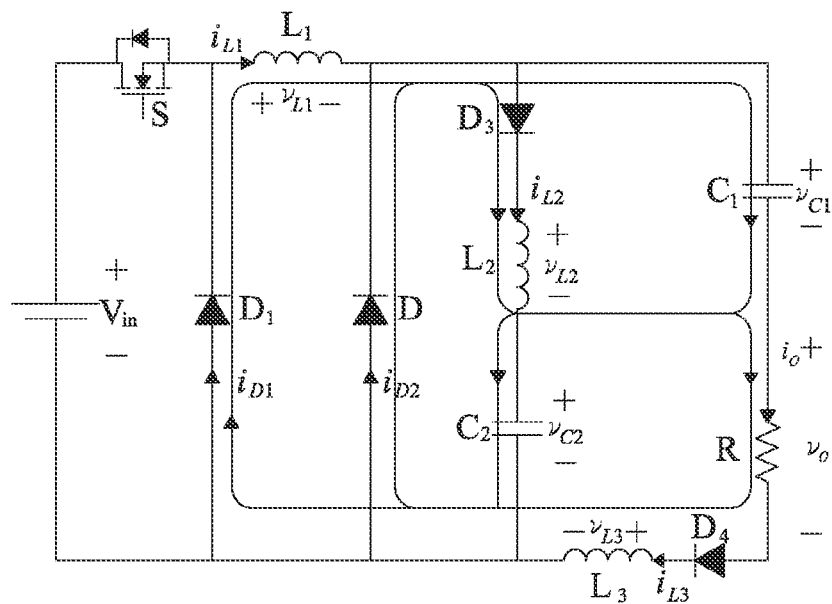
FIG. 7 shows the FIG. 4 circuit operation in the working model 3.

Working mode three: when the diode D2 is conduction, the single-stage buck converter circuit enters the working mode three. The first capacitor C1 and the second inductance L2 through diode D2 constitute a loop; cooperating with the second capacitor C2 and the third inductance L3 deliver the stored energy to the load, and inhibiting while input energy stop caused the output current ripples. As shown in FIG. 7, when the power transistor S is conduction again, namely the single-stage buck converter circuit of the present disclosure completes one cycle operation.

Figure 8:
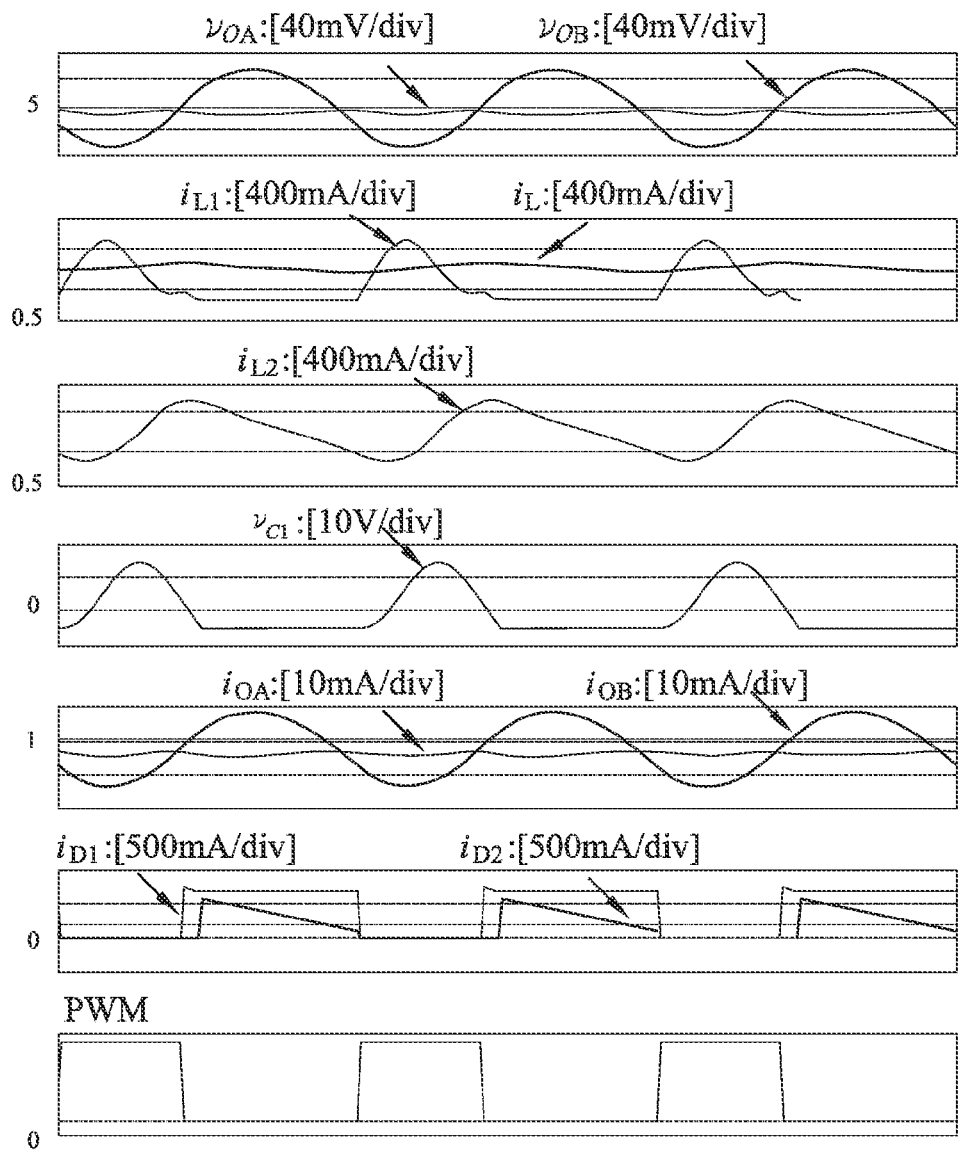
FIG. 8 shows substituting into the component parameters of the table 1 obtained the analog waveforms.

FIG. 8 shows substituting into the component parameters of the table 1 obtained the analog waveforms. As shown in FIG. 8, the control signal of the present disclosure single-stage buck converter circuit is PWM, the output voltage of the present disclosure single-stage buck converter circuit is VOA; VOB is the traditional buck converter circuit output voltage, iL1 is the first inductance L1 current, iL is the traditional buck converter circuit inductance L current, iL2 is second inductance L2 current, VC1 is the first capacitor C1 voltage, iOA is the output current, iOB is the output current of the traditional buck converter circuit, and iD1 and iD2 are respectively the diodes D1 and D2 current. As shown in FIG. 8, the present disclosure single-stage buck converter circuit output current ripple is 1.3 mA, while the traditional buck converter circuit output current ripple is 21.8 mA, thereby to know that the output current ripple of the traditional buck converter is 16.77 times higher than the present disclosure circuit. In addition, by FIG. 8 the simulation results can also be obtained the current iL1 of the present disclosure single-stage buck converter circuit inductance L1; when the switch is turned on, the rise rate of the iL1 is greater than traditional buck converter circuit inductance L current iL, thus learned that the present disclosure single-stage buck converter circuit has the input faster response characteristic.

TABLE 1

|  | Values |
| --- | --- |
| $L_1$ | 22 uH |
| $L_2$ | 52 uH |
| $L_3$ | 220 uH |
| $C_1$ | 0.044 uF |
| $C_2$ | 1 uF |
| R | 5 Ω |
| Input voltage $V_{in}$ | 12 V |
| Output voltage $V_o$ | 5 V |
| Switching frequency | 100 KHz |

The single-stage buck converter circuit proposed in the present disclosure, the main circuit architecture is integration the buck converter and the current type automatic charge pump (Auto Charge Pump) circuit. Through the parameters design and the role of LC resonant circuit, the circuit has a variable circuit structure characteristic to fulfill shared energy storage and filtering elements of the circuit design way, and thus achieving the input fast response, low ripple output current and prolong circuit the service life. The present disclosure circuit combines the capacitor C1 and the inductance L2 parallel circuit, another capacitor C2, another inductance L3 and three diodes, which constitute a current type automatic charge pump circuit. By the automatic charge pump circuit operation, the storage energy among the inductance L2, inductance L3, capacitor C1 and capacitor C2 is reached equilibrium. The present disclosure uses the circuit design and the role of the resonance circuit to obtain the charge and discharge time constant among of each capacitor and inductance are a desired value, and thus to control the diode conduction time and the capacitor discharge time. In addition, when the present disclosure circuit is operated in the energy input mode, the energy storage component inductance L1 and L2 are energy storage components. Due to current type automatic charge pump circuit role, the cross pressure of the capacitor C1 is inverse to −Vo, so that the input current has a faster response. Furthermore, owing to the capacitance value of the capacitor C2 is greater than the capacitance value of the capacitor C1, according to the voltage division principle, most of the input voltage will cross on the capacitor C1, thereby reducing while input-output current caused the output current ripple. Besides, when the present disclosure circuit is operated in the energy input mode, the circuit input current has a fast response; and when the circuit is operated in the energy output mode, the circuit output voltage has low output ripple. Therefore, the circuit design can use lesser capacitance value capacitor to avoid using electrolytic capacitor so as to prolong circuit service life. Alternatively, the circuit parameter design of the present disclosure can choose the energy storage inductance with smaller inductance value so that the circuit has input fast response; and by automatically change the circuit architecture characteristic, the output filtering circuit can be shared the circuit energy storage and its filtering element so as to change the output filtering circuit action time constant, and the circuit having low ripple output current, and thus the circuit design are able to avoid using electrolytic capacitor and prolong the converter service life. In summary, the present disclosure through the LC resonance circuit timing means to control circuit architecture change actuation time, and can automatically change circuit architecture without the active element, and be balanced automatically without the control energy, and can simplify circuit design. Furthermore, the present disclosure has negative voltage source characteristic which can overcome the load voltage potential barrier problems, such as LED forward conducting voltage and active power factor correction circuit zero crossing distortion, also can achieve sharing the energy storage and the filtering element circuit design ways, so as to obtain input fast response, low output ripple and long service life.

As the described above, it is only an example embodiment of the present disclosure, can not be used to limit the implementation scope of the present disclosure. Generally, in accordance with the present disclosure patent application scope for modifications and alterations all should still belong to the invention patent covers the range. Please your review members, and sincerely ask for your permission.

What is claimed is:

1. A single-stage buck converter circuit, comprising:
   a buck device comprising a power transistor, a first diode coupled to the power transistor, and a first inductance coupled to the power transistor and in parallel with the first diode;
   a semiconductor component coupled to the buck device;
   a first resonance circuit comprising a first capacitor, a second inductance, and a second diode, wherein one terminal of the second inductance is connected to one terminal of the first capacitor, another terminal of the second inductance is connected to a cathode of the second diode, another terminal of the first capacitor is connected to an anode of the second diode, and the first resonance circuit is coupled to the semiconductor component for adjusting operation time constant; and
   a second resonance circuit comprising a second capacitor, a third inductance, and a third diode, wherein one terminal of the third inductance is connected to one terminal of the second capacitor, another terminal of the third inductance is connected to a cathode of the third diode, another terminal of the second capacitor is connected to an anode of the third diode, and the second resonance circuit is coupled to the first resonance circuit for suppressing ripple;
   wherein when the power transistor is turned on, an input voltage starts charging the first inductance, the first capacitor, the second inductance, the third inductance and the second capacitor;
   wherein when the power transistor is turned off, the first inductance proceeds charging and discharging via the first diode, and the first capacitor and the second inductance impel a quick energy transfer to the second capacitor and the third inductance; and
   wherein when the semiconductor component is turned on, the first capacitor and the second inductance constitute a loop through the semiconductor component.

2. The single-stage buck converter circuit of claim 1, wherein the second resonant circuit further comprises a load, coupled to the second capacitor and connected to the third diode in series.

3. The single-stage buck converter circuit of claim 1, wherein the semiconductor component is a diode for adjusting output power or output voltage.

* * * * *